US005713445A

United States Patent [19]
Davis et al.

[11] Patent Number: 5,713,445
[45] Date of Patent: Feb. 3, 1998

[54] TRANSMISSION INERTIA BRAKE WITH SELF ENERGIZING

[75] Inventors: Alan R. Davis, Plainwell; Thomas N. Riley, Portage, both of Mich.

[73] Assignee: Eaton Corporation, Cleveland, Ohio

[21] Appl. No.: 681,255

[22] Filed: Jul. 22, 1996

[51] Int. Cl.$^6$ .............................. F16D 43/00; F16D 13/04; F16H 3/12
[52] U.S. Cl. .................... 192/35; 192/40; 74/339
[58] Field of Search .................... 74/337.5, 339; 192/4 A, 35, 40, 54.4

[56] References Cited

U.S. PATENT DOCUMENTS

| | | | |
|---|---|---|---|
| 5,435,201 | 7/1995 | Preston et al. | 74/337.5 |
| 5,441,137 | 8/1995 | Organek et al. | 192/35 |
| 5,469,948 | 11/1995 | Organek et al. | 192/35 |
| 5,485,904 | 1/1996 | Organek et al. | 192/35 |
| 5,505,285 | 4/1996 | Organek | 192/35 |
| 5,528,950 | 6/1996 | Organek et al. | 74/339 |

*Primary Examiner*—Khoi Q. Ta
*Attorney, Agent, or Firm*—Loren H. Uthoff; Howard D. Gordon

[57] ABSTRACT

A ball ramp mechanism is used to load a clutch pack in a transmission inertia brake to slow a rotating shaft where an armature having an angled peripheral surface engages a mating surface formed in an inertia brake housing to form a cone clutch where the armature is magnetically pulled toward the brake housing by an electromagnetic field generated by an electrical coil thereby introducing a frictional braking force on the armature. The armature is nonrotatably connected to the control ring of the ball ramp mechanism through a plurality of tapered pins which engage a corresponding plurality of conical sections so that relative rotation between the armature and the control ring causes the armature to be forced toward the housing thereby increasing the braking force on the armature and control ring. Relative rotation between the control ring and an actuation ring causes a plurality of rolling elements to transverse tapered grooves formed on the control ring and the actuation ring thereby axially expanding the ball ramp mechanism to load the clutch pack.

19 Claims, 3 Drawing Sheets

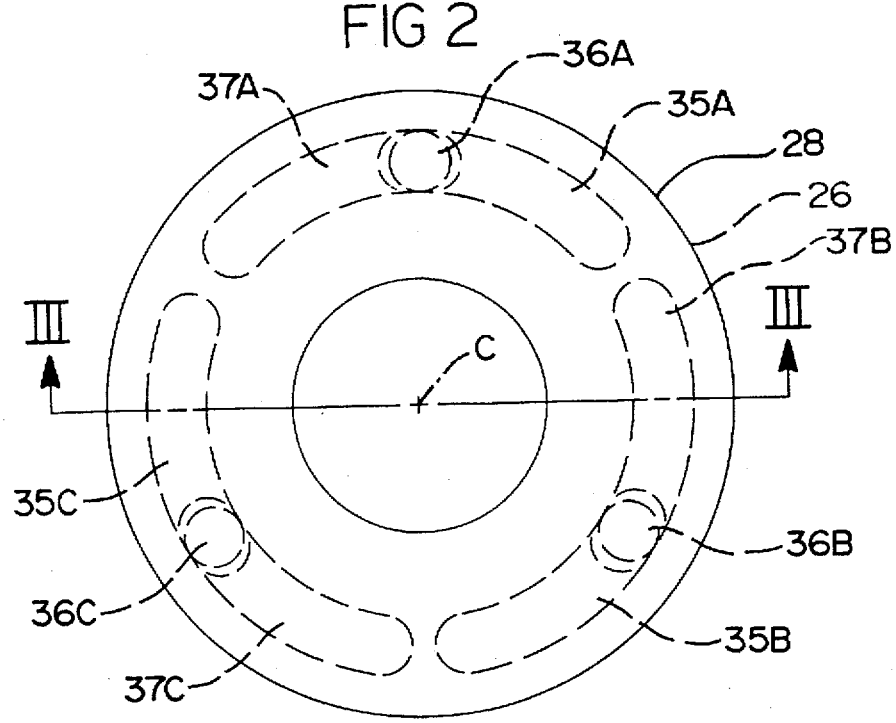
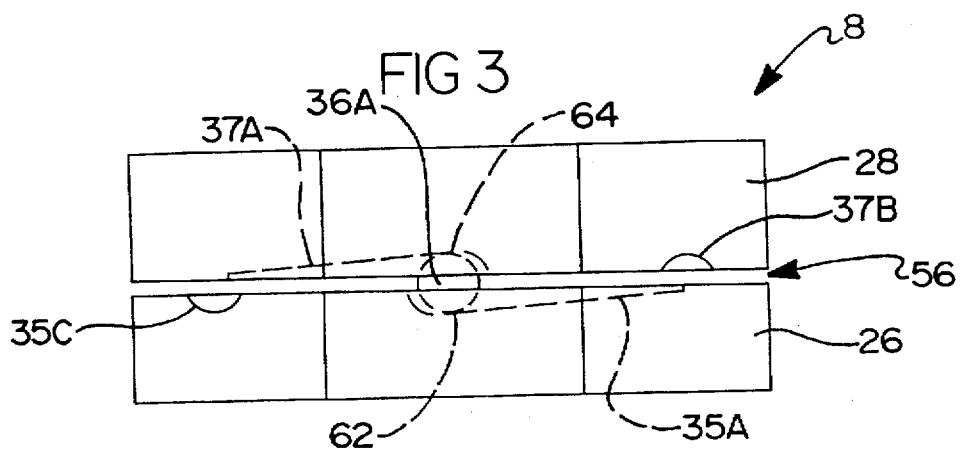
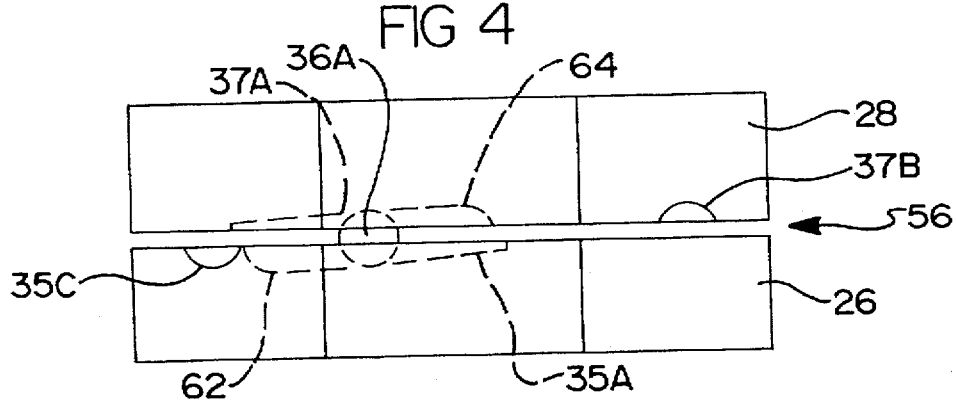

TRANSMISSION INERTIA BRAKE WITH SELF ENERGIZING

BACKGROUND OF THE INVENTION

1. Field of the Invention

The present invention relates to an inertia brake for a vehicle transmission. More specifically, the present invention relates to an inertia brake for a vehicle transmission where a ball ramp actuator is used to load a clutch pack according to a control signal where a plurality of tapered pins assist a control coil in activation of a cone clutch which activates the ball ramp actuator.

2. Description of the Prior Art

Transmissions that have their shifting accomplished using actuators controlled by a microprocessor in response to a driver request and various sensor inputs have been developed and are just now entering the marketplace. Sophisticated electronic transmission controls are being used to control shift actuators that act to shift a gear change transmission independent of the driver. When a transmission countershaft and gear assembly having a high rotational inertia is accelerated with the engine, a shift requires the shaft to be released usually by release of a master clutch. Shifting of such a multiple speed gear transmission without synchronizers requires that the speeds of the gears that are to be meshed be matched so that a smooth gear tooth engagement can take place. A gear on a spinning shaft that exceeds the desired mesh speed (synchronous speed) must be allowed to slow before the gear shift can be effectuated. Thus, while the shaft is slowing, there is no driveline link between the engine and the transmission. If the vehicle is on an upgrade, especially when pulling a loaded trailer, disconnection of the transmission from the engine allows the vehicle to rapidly slow. Thus, while waiting for the transmission gear shaft to slow to synchronous speed, the vehicle itself slows enough that the gear ratio originally selected for the shift is no longer appropriate.

The next shift must then be calculated and selected by the electronic control package. Once again, as the electronic controller waits for the gear shaft to slow to synchronous, the vehicle continues to rapidly decelerate until the second selected downshift is no longer appropriate. Eventually, the vehicle comes to a stop without a successful upshift being accomplished. Problems in quickly executing a shift due to the length of time required for a transmission gear shaft to decelerate to synchronous speed results in operational problems as heretofore described. Also, when a conventional transmission without an electronic control system is shifted, an inertia brake allows shifts to be made more rapidly for improved driver control of the vehicle.

To date, various traditional type braking devices have been used to reduce the rotational speed of a spinning transmission shaft. For example, shoe type brakes and disc clutches using springs for loading of a clutch pack have been used. The inertia brake devices can be connected to any shaft that is connected to rotate with the input shaft of the transmission including one or more countershafts. U.S. Pat. No. 5,528,950 entitled "Transmission Inertia Brake With Ball Ramp Actuator", assigned to a common assignee with this application, discloses using a ball ramp actuator to load a clutch pack. One desirable improvement to this device would be a method to lower the power requirement and/or size of the electrical coil that controls the ball ramp actuator.

SUMMARY OF THE INVENTION

The present invention provides for the braking and subsequent slowing of the rotation of a countershaft in a gear change transmission by means of an inertia brake having a clutch pack comprised of a plurality of clutch friction plates which are clamped together by means of a ball ramp actuator where a cone clutch, which supplies a braking force to the control ring of the ball ramp actuator, is further engaged by tapered pins. The ball ramp mechanism axially expands to provide a clamping force on the clutch pack to frictionally couple the transmission countershaft to case ground. The clutch pack is made up of a plurality of clutch stationary friction plates grounded to the housing and a like number of clutch rotating friction plates splined to rotate with the input shaft of a change gear transmission which combine to apply a rotational retarding torque to the spinning transmission input shaft to facilitate gear changes. The ball ramp mechanism consists of the control ring and a corresponding actuation ring separated by rolling elements which engage variable depth grooves formed in the control and actuation rings. Initially, the degree of activation of the ball ramp actuator, and hence the clutch pack, is controlled by a coil which electromagnetically pulls an armature into frictional contact with a grounded tapered surface thereby forming what is known in the art as a "cone clutch". A plurality of tapered pins are mounted on the armature and axially extend to engage conical cavities formed on the control ring of the ball ramp mechanism.

As the armature is pulled toward the electromagnet, its rotation is slowed by frictional engagement with the tapered surface. This braking force is transferred to the control ring of the ball ramp mechanism through the tapered pins. The tapered pins can work up the sides of the conical cavities so as to provide an additional axial force on the armature further retarding the rotation of the armature and the control ring to further activate the ball ramp mechanism. Detailed disclosures of the construction and operation of a ball ramp mechanism can be found in U.S. Pat. Nos. 2,091,270; 2,605,877; 2,649,941; 3,000,479 and 5,372,106, the disclosures of which are hereby incorporated by reference. The tapered pins reduce the energy required from the electromagnet to fully load the clutch pack for efficient braking of the transmission countershaft thereby reducing the size of the coil as compared to prior art devices. The response time of the ball ramp mechanism is normally quite rapid and is made even more so with the use of the tapered pins of the present invention.

The inertia brake of the present invention can be applied to any freely rotating shaft in the transmission that requires speed reduction to effectuate a gear ratio change. Thus, application of the inertia brake to the transmission input shaft and/or countershaft(s) or even to a power take-off would be possible to assist in rapid gear ratio changes.

The use of the present invention would allow a transmission gear change to be completed more rapidly and more reliably especially when sophisticated automatic electronic controls are utilized to do the shifting. As discussed supra, the transmission shifting controller cannot select the correct gear when the vehicle is on a steep grade if the transmission cannot be brought into synchronization quickly to complete a shift. The present invention allows the transmission shaft (s) to be quickly slowed and brought into synchronization so that a shift can be quickly and reliably completed with the use of a ball ramp actuator having a low power requirement. The use of a ball ramp actuator of the present invention to axially load the clutch pack provides a device with a more rapid response with low energy consumption and reduced packaging size for the forces created as compared to prior art devices.

One provision of the present invention is to provide a compact, rapid response inertia brake for slowing a rotating transmission shaft.

Another provision of the present invention is to provide a compact, rapid response inertia brake for slowing a rotating transmission shaft utilizing a ball ramp actuator to load a clutch pack.

Another provision of the present invention is to provide a compact, rapid response inertia brake for slowing a rotating transmission shaft utilizing a ball ramp actuator to load a plurality of friction plates where some of the friction plates are nonrotatably connected to a transmission shaft and other friction plates are nonrotatably connected to case ground.

Another provision of the present invention is to provide a plurality of tapered pins to assist an electromagnet in activation of a ball ramp mechanism.

Another provision of the present invention is to provide a plurality of tapered pins which engage a corresponding plurality of conical cavities to assist an electromagnet in activation of a ball ramp actuator.

Still another provision of the present invention is to provide a plurality of tapered pins attached to an armature of an electromagnet which engage a corresponding plurality of conical cavities formed in a control ring of a ball ramp mechanism to further force the armature against a tapered surface.

BRIEF DESCRIPTION OF THE DRAWINGS

FIG. 2 is an elevational view of the ball ramp mechanism of the present invention;

FIG. 3 is a sectional view of the ball ramp mechanism of FIG. 2 taken along line III—III at minimum separation;

FIG. 4 is a sectional view of the ball ramp mechanism of FIG. 2 taken along line III—III at an intermediate separation;

DETAILED DESCRIPTION OF THE PREFERRED EMBODIMENT

Figure 1:
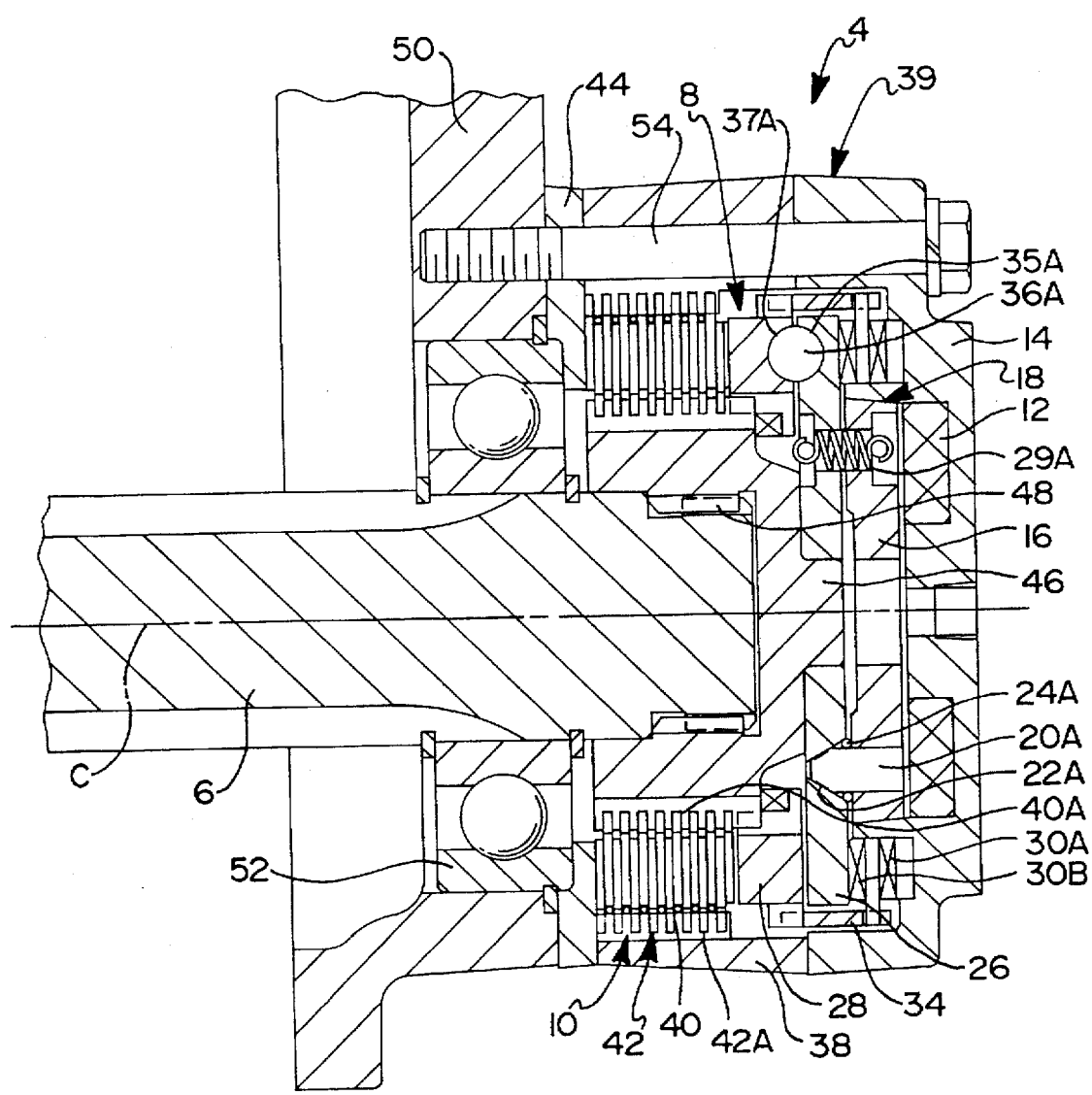
FIG. 1 is a cross-sectional view of the transmission inertia brake of the present invention.

For purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In this disclosure, certain terminology will be used in the following description for convenience in reference only and will not be limiting. For example, the terms "forward" and "rearward" will refer to directions forward and rearward of the inertia brake as installed on a transmission. The terms "rightward" and "leftward" will refer to directions in the drawings in connection with which the terminology is used. The terms "inwardly" and "outwardly" will refer to directions toward and away from, respectively, the geometric center of the brake assembly of the present invention. The terms "upward" and "downward" will refer to directions as taken in the drawings in connection with which the terminology is used. All foregoing terms mentioned above include the normal derivatives and equivalents thereof. The term transmission as used herein shall include all types of gear change transmissions including single countershaft and twin countershaft types.

Now referring to FIG. 1 of the drawings, a cross-sectional view of the inertia brake 4 of the present invention is shown. A transmission shaft 6 extends from a gear change transmission (not shown) and rotates on centerline C when driven by a prime mover such as an engine or when coasting. To properly shift the gear change transmission, the transmission shaft 6, which is commonly known as a countershaft, must be slowed so that the transmission gears can be synchronized and shifted into engagement. Ideally this shift event takes place in a short time period especially when the vehicle is operating on a grade. According to the present invention a ball ramp mechanism 8 is used to load a clutch pack 10 thereby frictionally coupling the transmission shaft 6 to ground thereby rapidly slowing the rotational speed of the transmission shaft 6 for more rapid synchronization of the transmission gears to facilitate a rapid gear change.

The ball ramp mechanism is activated using an electrical coil 12 which produces an electromagnetic field so as to attract the armature 16 toward the end plate 14 causing a frictional braking torque to be generated at the tapered surfaces 18. The tapered surfaces 18 consist of mating surfaces formed on the armature 16 and on the brake housing 38 to form what is known in the art as a "cone clutch". In a cone clutch, the frictional engagement increases as the armature 16 increases its engagement with the brake lining 38 at the tapered surfaces 18. Most all of the rotating elements disclosed in the present invention are circular in shape and rotate around the rotational axis C.

Tapered pins 20A, 20B and 20C (see FIG. 5) are attached to the armature 16 and axially extend to engage respective conical cavities 22A, 22B and 22C formed in the control ring 26. This arrangement could be reversed with the tapered pins 20A, 20B and 20C mounted to the control ring 26 and the conical cavities 22A, 22B and 22C formed in the armature 16. Seals 24A, 24B and 24C surround respective tapered pins 20A, 20B and 20C and function to help align the armature 16 upon deactivation as it moves back toward the control ring 26 due to the force generated by return springs 29A, 29B and 29C.

The annular control ring 26 and the annular actuation ring 28 are axially separated by rolling elements 36A, 36B and 36C which ride in their respective control grooves 35A, 35B and 35C formed in the control ring 26 and in respective actuation grooves 37A, 37B and 37C formed in the actuation ring 28. All of the control and actuation grooves varying in axial depth are more clearly illustrated in FIGS. 3 and 4. The axial separation between the control ring 26 and the actuation ring 28 is determined by the position of the rolling members 36A, 36B and 36C in their respective control and actuation grooves 35A, 37A and 35B, 37B and 35C, 37C. The ball ramp mechanism 8 is activated upon the introduction of electrical current into the coil 12 which draws the armature 16 away from the control ring 26 into the end plate 14 at the tapered surfaces 18 to apply a rotational braking force on the control ring 26 through the tapered pins 20A, 20B and 20C. The braking force created on the control ring 26 causes relative rotation between the control ring 26 and the actuation ring 28 thereby causing the control ring 26 to axially separate from the actuation ring 28 and load the clutch pack 10. Return springs 29A, 29B and 29C apply a retraction force to draw the armature 16 toward the control ring 26 but allow increased separation if there is relative rotation between the armature 16 and the control ring 26 as the tapered pins 20A, 20B and 20C travel up the surfaces of their respective conical cavities 22A, 22B and 22C thereby resulting in further axial travel of the armature toward the end plate 14 with increased frictional force generated at the tapered surface 18 which increases the rotational braking of the control ring 26 in addition to that generated by the coil 12. Note that the conical cavities 22A, 22B and 22C are defined for purposes of this disclosure as including all shapes including conical and spherical that would function in a similar manner to provide an axial force on the tapered pins 20A, 20B and 20C when there is relative rotation between the control ring 26 and the armature 16.

The thrust bearings 30A and 30B function to transfer axial forces from the control ring 26 to the end plate 14 thereby providing a reaction surface for the ball ramp mechanism 8 to provide a clamping force on the clutch plate 10. The thrust bearings 30A and 30B are separated by a ring extension 34 where the ring extension 34 is rotationally contacted to the actuation ring 28 and functions to prevent parasitic drag from activating the ball ramp mechanism 8 when the coil 12 is deactivated by introducing the rotation of the actuation ring 28 into the thrust bearings 30A and 30B. With the use of the ring extension 34, the ball ramp mechanism 8 remains in a retracted, deactivated state when the current to the coil 12 is terminated and parasitic drag does not cause inadvertent activation of the ball ramp mechanism 8.

The clutch pack 10 is formed of a plurality of alternating driven clutch plates 40 and stationary clutch plates 42 where the driven clutch plates 40 are rotationally connected to the transmission shaft 6 by splines 40A which engage the hub 46 where the hub 46 is rotationally driven by the transmission shaft 6 through splines 48. The stationary clutch plates 42 are keyed to the clutch housing 38 through splines 42A. Thus, when the clutch pack 10 is compressed by the ball ramp mechanism 8, the transmission shaft 6 is frictionally connected to the clutch housing 38 through the driven clutch plates 40 and the stationary clutch plates 42. The clutch housing 38 is secured to the end plate 14 and the transmission case 50 with fasteners 54 which extend through base plate 44 which locates the support bearing 52 which rotationally supports the transmission shaft 6 on the transmission case 50. The combination of the base plate 44, brake housing 38 and the end plate 14 can be considered as the inertia brake housing 39 which is mounted to the transmission case 50. The combination of the base plate 44, brake housing 38 and the end plate 14 can be considered as the inertia brake housing 39 which is mounted to the transmission case 50.

Now referring to FIG. 2, an elevational view of the ball ramp mechanism 8 of the present invention is shown. Variable depth circumferential control grooves 35A, 35B and 35C are formed in the control ring 26 and identical actuation grooves 37A, 37B and 37C are formed in the actuation ring 28. Control grooves 35A, 35B and 35C at least partially oppose respective actuation grooves 37A, 37B and 37C with rolling spherically shaped elements 36A, 36B and 36C providing axial separation between the control ring 26 and the actuation ring 28 and trapped between the opposed control and actuation grooves 35A, 37A and 35B, 37B and 35C, 37C. Thus, rolling element 36A engages grooves 35A and 37A; rolling element 36B engages grooves 35B and 37B; and rolling element 36C engages grooves 35C and 37C.

FIG. 3 is a cross-sectional view of the ball ramp mechanism 8 of FIG. 2 taken along line III—III. From this view, the separation distance 56 is clearly illustrated where the rolling element 26A is positioned in control groove 35A in the control ring 26 and in actuation groove 37A in the actuation ring 28 to provide a minimum separation distance 56. Note the varied depth of control and actuation grooves 35A and 37A which is identical to the geometry of control and actuation grooves 35B, 35C, 37B and 37C. Reference point 62 on control grooves 35A and reference point 67 on actuation grooves 37A are used to illustrate the relative rotation between the control ring 26 and the actuation ring 28 when the coil 12 is electrically energized and the ball ramp mechanism 8 is activated as shown in FIG. 4.

Now referring specifically to FIG. 4, a cross-sectional view of the ball ramp mechanism 8 of FIG. 2 taken along line III—III is shown with the ball ramp mechanism 8 partially activated. The control ring 26 has been rotated relative to the actuation ring 28 as illustrated by the shifting of reference points 62 and 64. The rolling element 36A has traversed portions of both control and actuation grooves 35A and 37A thereby increasing the separation distance 56 between the control ring 26 and the actuation ring 28. The control ring 26 is held in axial position relative to the transmission case 50 by the thrust bearing 30A and 30B which react against the end plate 14. Thus, the actuation ring 28 is moved toward the left to compress the clutch pack 10 thereby frictionally slowing the rotation of the transmission shaft 6 by reacting it indirectly to the transmission housing 8.

Figure 5:
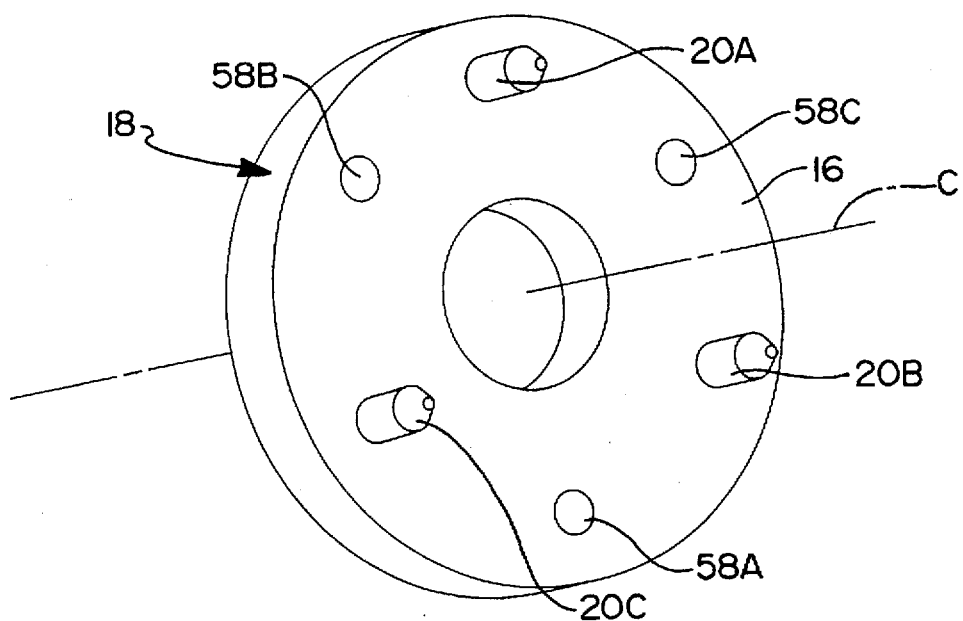
FIG. 5 is a perspective view of the armature of the present invention.

Now referring to FIG. 5, a perspective view of the armature 16 of the present invention is shown. Tapered pins 20A, 20B and 20C axially extend from the armature 16. Apertures 58A, 58B and 58C allow for passage of respective return springs 29A, 29B and 29C to pass therethrough as shown in FIG. 1. The tapered surface 18 acts with the end plate 14 to form what is known in the art as a "cone clutch" to provide exceptional braking control of the control ring 26 through the tapered pins 20A, 20B and 20C which engage the conical cavities 22A, 22B and 22C respectively. Note that the tapered pins 20A, 20B and 20C could be mounted in the control ring 26 with the conical cavities 22A, 22B and 22C formed in the armature 16.

Figure 6:
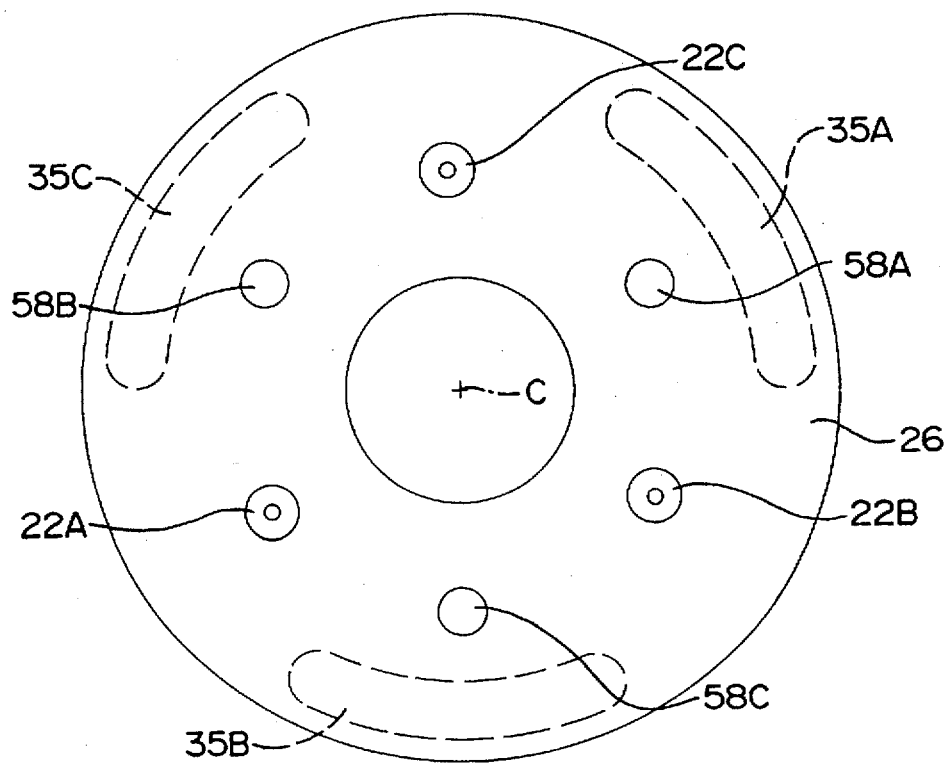
FIG. 6 is an elevational view of the control plate of the present invention.

FIG. 6 is an end view of the control ring 26 more clearly showing the conical cavities 22A, 22B and 22C of the present invention. The circular cross-section of the conical cavities 22A, 22B and 22C provides for the introduction of an axial separation force between the control ring 26 and the armature 16 with any relative rotation between the control ring 26 and the armature 16 which further engages the tapered surface 18 thereby increasing the rotational braking force on the control ring 26 and increasing the clamping force on the clutch pack 10. When the coil 12 is energized, the armature 16 is pulled away from the control ring 26 against the return springs 29A, 29B and 29C into the end plate 14. The tapered pins 20A, 20B and 20C are pulled partially out of full engagement in the conical cavities 22A, 22B and 22C. Thus, after the initial activation, the ends of the tapered pins 20A, 20B and 20C are contacting the sides of the conical cavities 22A, 22B and 22C.

It will be appreciated by those of ordinary skill in the art that many variations in the foregoing preferred embodiment are possible while remaining within the scope of the present invention. Thus, the present invention should not be considered limited in the preferred embodiments or the specific choices of materials, configurations, applications or ranges of parameters employed therein.

We claim:

1. An inertia brake for slowing the rotation of a freely rotating shaft in a transmission comprising:

a transmission case containing at least one transmission shaft and a plurality of transmission gears for changing a gear ratio in a vehicle driveline;

an inertia brake housing having a cavity therein, said housing attached to said transmission case;

a clutch pack having a plurality of drive plates nonrotatably attached to said transmission shaft and a plurality of stationary plates attached to said brake housing;

a ball ramp actuator for loading said clutch pack comprising: an actuation ring disposed adjacent to said clutch pack where axial movement of said actuation ring results in a loading and an unloading of said clutch pack; a control ring disposed opposite to said actuation ring, said control ring and said actuation ring having opposed faces provided with circumferentially extending grooves, said grooves comprised of at least three opposed pairs of grooves having portions of varying depth; and rolling members disposed one in each of opposed pair of said grooves, said groove formed in said actuation ring and said control ring being arranged so that relative angular movement of said actuation ring and said control ring from a starting position thereof, causes axial movement of said actuation ring away from said control ring to axially load said clutch pack;

an armature coupled to said control ring using a plurality of tapered pins engaging a like number of corresponding conical cavities such that relative rotation between said armature and said control ring results in an increase and decrease in axial separation between said armature and said control ring; and an electrical coil disposed to generate an electromagnetic field acting on said armature causing said armature to contact said inertia brake housing.

2. The inertia brake of claim 1, wherein said conical cavities are formed in said control ring and said tapered pins are attached to said armature.

3. The inertia brake of claim 1, wherein said conical cavities are formed in said armature and said tapered pins are attached to said control ring.

4. The inertia brake of claim 1, further comprising at least one return acting to force said armature toward said control ring.

5. The inertia brake of claim 1, further comprising at least one thrust bearing disposed between said control ring and said inertia brake housing.

6. The inertia brake of claim 5, further comprising a ring extender connected to said actuation ring and axially extending to contact said thrust bearing.

7. The inertia brake of claim 6, wherein said thrust bearing is comprised of a pair of roller bearings separated by said ring extender.

8. The inertia brake of claim 1, wherein said armature has an angled peripheral edge and wherein said inertia brake housing has an angled surface adapted to engage said angled surface of said armature such that a friction force generated by contact between said armature and said inertia brake housing increases in magnitude as said armature is moved towards said inertia brake housing.

9. The inertia brake of claim 8, wherein said armature and said inertia brake housing comprise a cone clutch.

10. A ball ramp coupling mechanism comprising:

a rotating input shaft driven by a prime mover and rotating about an axis of rotation;

an inertia brake housing partially surrounding said input shaft;

a clutch pack comprised of a plurality of stationary clutch plates coupled to said brake housing interdigitated with a plurality of driven clutch plates coupled to said input shaft;

a ball ramp actuator for generating an axial movement comprising; an annular control ring having an axis of rotation along said axis of rotation of said input shaft and having at least two circumferential control grooves formed in a first face of said control ring, said control grooves varying in axial depth, an equivalent number of rolling elements one occupying each of said control grooves, an actuation ring having an axis of rotation along said axis of rotation of said input shaft, said actuation ring having at least two actuation grooves substantially identical in number, shape and radial position as said control grooves in said control ring where said actuation grooves at least partially oppose said control grooves and where each of said rolling elements is trapped between said actuation ring and a respective at least partially opposed control ring, said control ring axially and rotationally movably disposed relative to said actuation ring, said actuation ring loading said clutch plate;

an armature nonrotatably linked to said control ring with a plurality of tapered pins, said tapered pins engaging a plurality of corresponding conical cavities, said armature applying a rotational braking force on said control ring to activate said ball ramp actuator; and a coil for creating a magnetic field in said armature thereby magnetically forcing said armature into frictional contact with said inertia brake housing to apply a rotational braking force on said armature.

11. The ball ramp coupling mechanism of claim 10, wherein said tapered pins axially extend from said armature and said conical cavities are formed in said control ring.

12. The ball ramp coupling mechanism of claim 10, wherein said tapered pins axially extend from said control ring and said conical cavities are formed in said armature.

13. The ball ramp coupling mechanism of claim 10, wherein said coil is mounted in said inertia brake housing.

14. The ball ramp coupling mechanism of claim 10, wherein said input shaft is a gear change transmission output shaft.

15. The ball ramp coupling mechanism of claim 10, further comprising a thrust bearing disposed to rotationally transfer an axial force from said control ring to said inertia brake housing.

16. The ball ramp coupling mechanism of claim 15, wherein said thrust bearing is comprised of first and second annular needle bearings, said first needle bearing contacting said control ring and said second needle bearing contacting said inertia brake housing.

17. The ball ramp coupling mechanism of claim 16 further comprising a ring extension connected to said actuation ring and extending to provide a bearing surface between said first and second needle bearings.

18. The ball ramp coupling mechanism of claim 10, further comprising at least one return spring attached to said control ring and said armature axially biasing said armature toward said control ring.

19. The ball ramp coupling mechanism of claim 10, wherein said armature has a tapered peripheral surface engaging a mating tapered surface formed in said inertia brake housing to function as a cone clutch.

* * * * *